United States Patent
Zimmerman et al.

(10) Patent No.: US 8,533,132 B2
(45) Date of Patent: Sep. 10, 2013

(54) SYSTEMS AND METHODS FOR IMPLEMENTING A MACHINE-LEARNING AGENT TO RETRIEVE INFORMATION IN RESPONSE TO A MESSAGE

(75) Inventors: John Zimmerman, Pittsburgh, PA (US); Anthony Tomasic, Pittsburgh, PA (US); Ian Hargraves, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 447 days.

(21) Appl. No.: 12/841,714

(22) Filed: Jul. 22, 2010

(65) Prior Publication Data
US 2011/0022552 A1 Jan. 27, 2011

Related U.S. Application Data

(60) Provisional application No. 61/271,506, filed on Jul. 22, 2009.

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | | |
|---|---|---|---|---|
| 6,912,517 B2 * | 6/2005 | Agnihotri et al. | ................ | 706/45 |
| 7,328,233 B2 * | 2/2008 | Salim et al. | .................... | 709/202 |
| 7,373,336 B2 * | 5/2008 | Jasinschi et al. | ....................... | 1/1 |
| 7,933,968 B1 * | 4/2011 | Zimmerman | ................. | 709/217 |
| 7,934,233 B2 * | 4/2011 | Zimmerman et al. | .......... | 725/46 |

* cited by examiner

*Primary Examiner* — Michael B Holmes
(74) *Attorney, Agent, or Firm* — Downs Rachlin Martin PLLC

(57) ABSTRACT

Mixed-initiative message-augmenting agent systems and methods that provide users with tools that allow them to respond to messages, such as email messages, containing requests for information or otherwise requiring responses that require information that needs to be retrieved from one or more data sources. The systems and methods allow users to train machine-learning agents how to retrieve and present information in responses to like messages so that the machine-learning agents can eventually automatedly generate responses with minimal involvement by the users. Embodiments of the systems and methods allow users to build message-augmenting forms containing the desired information for responding to messages and to demonstrate to the machine-learning agents where to retrieve pertinent information for populating the forms. Embodiments of the systems and methods allow users to modify and repair automatically generated forms to continually improve the knowledge of the machine-learning agents.

30 Claims, 9 Drawing Sheets

200

```
○○○         Student injured in Wean Corridor — Sent mphelps@cmu.edu        ○
 ⊘      🗑        ↩    ↩↩    ↪        🖨
Delete  Junk     Reply  Reply All Forward  Print
``` from: mphelps@cmu.edu
to: II3w@andrew cmu.edu
subject: Student injured in Wean Corridor The following student: Steve Smith, a CIT sophomore fell in the 4th floor corridor of Wean Hall and was transported to UPMC Montefiore with a suspected broken leg.

Mark Phelps
CMU Police        212

In Hospital

Student        First       Smith
                   Last        Steven
                   SSN         543789456
                   Andrew ID   ssmith
204 →              Class       Sophomore
                   Dept        CIT
                   Program     CEE
                   Home Address 12 Oak St, Lancaster, PA 15103
                   Contact 1   Jill Smith
                   Contact 1 Phone  494-567-8976
                   Contact 2   Jason Smith
                   Contact 2 Phone  494-663-0067

Enrolled

| Sem | # | Sec | Cred | Course | Time | Loc | Instructor | Instructor email |
|-----|---|-----|------|--------|------|-----|------------|------------------|
| S06 | 17290 | a | 12 | Computers and Soci.. | MW 10.30–11.50 | WH427 | Britten, P | pbritten@cmu.edu |
| S06 | 36202 | a | 12 | Statistical Methods | MW 10.00–11.20 | WH521 | Yap, M | myap4@andrew.cmu.edu |
| S06 | 36208 | a | 12 | Regression Analysis | TR 10.30–11.50 | WH427 | Watts, E | ewatts@cmu.edu |
| S06 | 24231 | a | 12 | Fluid Mechanics | TR 1.30–4.20 | SH221 | Ward, B | ward@cmu.edu |

208

216 — Repair this Form
220 — Mark this Form as OK
224 — Attach Other Forms

FIG. 2

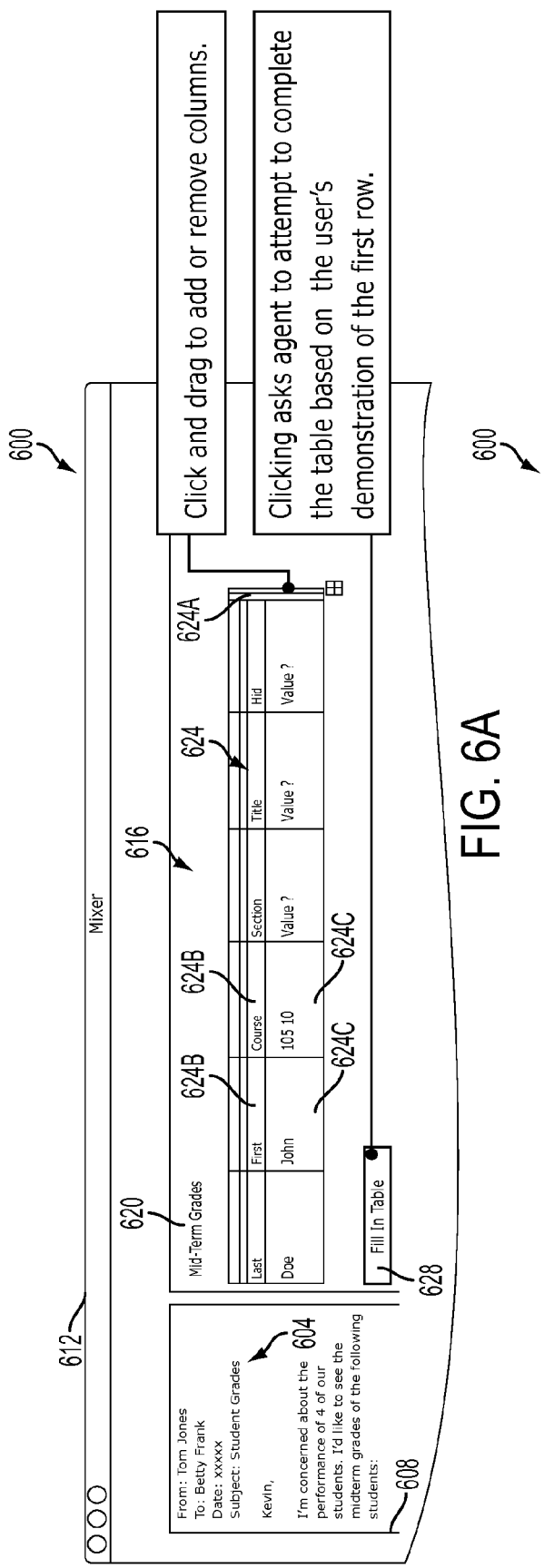
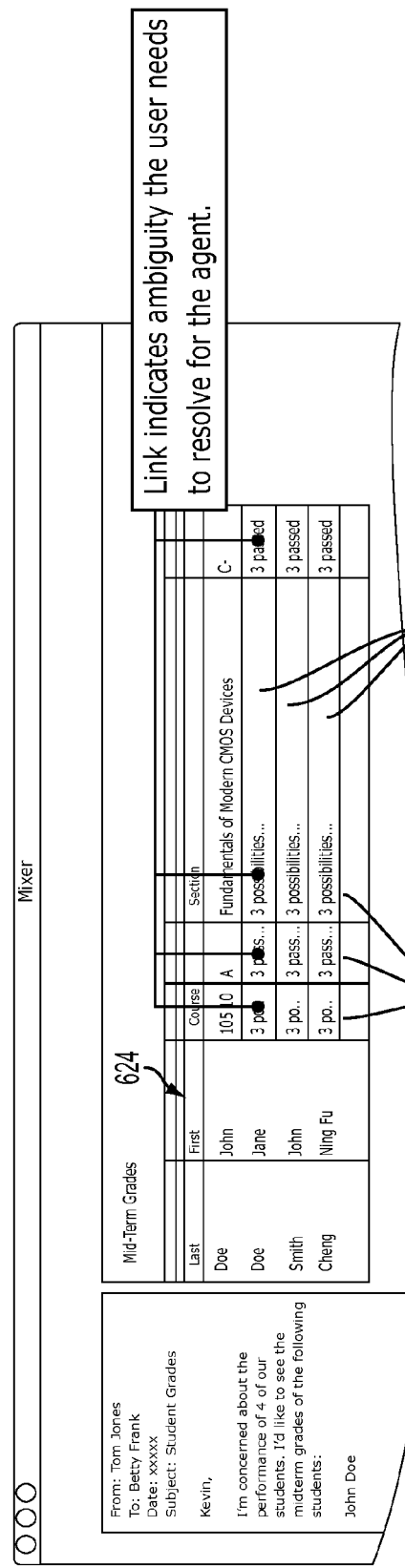
FIG. 6A
FIG. 6B

Mixer

From: Tom Jones
To: Betty Frank
Date: xxxxx
Subject: Student Grades

Kevin,
I'm concerned about the performance of 4 of our students. I'd like to see the midterm grades of the following students:

John Doe
Jane Doe
John Smith
Ning Fu Cheng

Can you please get me the midterm grades for all of their current classes.

Thanks,
Tom Jones
Associate Professor

Mid-Term Grades

| Last | First | Course | Section | Title | |
|---|---|---|---|---|---|
| Doe | John | 18610 | A | Fundamentals of Modern CMOS Design | C- |
|  |  | 18799 | G | Special Topics in Signal Processing: Wavelet Multiresolution Techniques | B- |
|  |  | 18079 | S | Special Topics in Systems and Control: Networked Control Systems | A- |
| Doe | Jane | 18793 | A | Optical Image and Radar Processing | C- |
|  |  | 18794 | A | Pattern Recognition Theory | C- |
|  |  | 18842 | A | Distributed Systems | C+ |
| Smith | John | 18622 | A | Advanced Digital IC Design | C- |
|  |  | 18753 | A | Information Theory and Coding |  |
|  |  | 18794 | A | Pattern Recognition Theory | C+ |
| Cheng | Ning Fu | 18648 | A | Distributed Embedded Systems |  |
|  |  | 18757 | A | Network Management and Control |  |
|  |  | 18842 | A | Distributed Systems |  |

624

Fill In Table

Completed form ready to be saved. The yellow background indicates items users can click on to go to the Resolver in order to redefine the found set.

FIG. 6D

SYSTEMS AND METHODS FOR IMPLEMENTING A MACHINE-LEARNING AGENT TO RETRIEVE INFORMATION IN RESPONSE TO A MESSAGE

RELATED APPLICATION DATA

This application claims the benefit of priority of U.S. Provisional Patent Application Ser. No. 61/271,506, filed on Jul. 22, 2009, and titled "System And Method For Communicating And Training A Machine-Learning Agent To Anticipatorily Retrieve Effective Information In Response To An Incoming Message," which is incorporated by reference herein in its entirety.

STATEMENT REGARDING FEDERALLY SPONSORED RESEARCH OR DEVELOPMENT

The present invention was made, in part, with government support under grant number NBCHD 030010 awarded by DARPA. The United States government may have certain rights in this invention.

FIELD OF THE INVENTION

The present invention generally relates to the field of information systems. In particular, the present invention is directed to systems and methods for implementing a machine-learning agent to retrieve information in response to a message.

BACKGROUND

Information systems, from small locally built databases to full enterprise systems, have produced large gains in productivity and transformed work practices. Evidence of their influence can be seen in the fact that 70% of Fortune 1000 businesses currently employ enterprise systems. These systems organize, store, and provide access to data via reports, allowing workers to gather effective information, i.e., the information needed to take action in a particular situation, in response to incoming requests. User-centric design methods, such as "contextual design," have played a role in increasing the effectiveness of information systems by improving the understanding of workers' needs for information. However, today's workers often find themselves spending time gathering effective information from several reports and several sources in order to address a particular task. The disconnection between the published reports and the informational needs of a particular situation diminishes the responsiveness of a worker, and, distributed across many workers, this problem impacts the responsiveness of the organization as a whole.

This limitation of responsiveness arises from the disconnection between the immediate and dynamic informational needs of workers addressing a particular situation and the static model of the systems that have been designed to support the work. Four reasons have been identified as causing this disconnection.

Design model: During the design phase of any information system, the designers can never accurately model every task that every worker performs. The design team will always miss tasks, variations, and exceptions that do not arise during the course of their investigation.

Optimization of core: When translating workers' needs to the system design, designers optimize for the core and critical tasks workers perform. This strategy works to optimize much of the work, but often edge tasks become time consuming. Most organizations have many edge tasks.

Changing needs: In general, the information needed to complete a task changes much more rapidly than the underlying information systems. For example, financial reporting laws change the information needed in annual reports, and changes to the law take place more often than the accounting software in companies gets completely redesigned.

New information: Over time new information sources, particularly external sources available from the Internet, become available. This access to new information often changes the requirements needed to complete a task or changes the strategy a worker takes to complete a task.

Instead of information systems adapting to the individual and changing needs of workers, workers adapt their work practice to the capabilities and limitations of the information systems. Workers develop a practice-based expertise in acquiring the information that they need. Workers also construct their own information tools to work around the weaknesses of the information system. These tools include local information caches, such as a list of frequently used account numbers taped to the wall or desk; however, these shortcuts suffer from being out of sync with the underlying systems. Organizations can choose to re-engineer their internal systems to repair the disconnection between the system model and worker needs; however, this is expensive, time consuming, and still results in a static system. Organizations can also employ engineers to develop customized interfaces for specific tasks, but this is too expensive to address more than high-volume tasks and also results in a system that cannot adapt to changing needs.

Researchers have recognized that workers repeatedly perform the same task when interacting with a computer and have investigated how workers can build their own tools. End-user programming and programming-by-demonstration based systems assist workers in building such tools. The challenge is to accurately capture and automate specific activities without placing undue demands on the user to learn complex programming. In practice, systems with full programming capacities are often too complex while the ability to record simple macros lacks the fullness of expression that the work requires.

SUMMARY OF THE DISCLOSURE

In one implementation, the present disclosure is directed to a method of creating a machine-learning agent for retrieving data stored in at least one data source residing in a location accessible using a machine. The method includes: displaying data from the at least one data source to a user on a machine display in a build-and-demonstrate user interface; selecting a first piece of the data from the at least one data source displayed on the machine display, wherein the first piece of data has a first data type; and copying the first piece of the data from the at least one data source to a form, wherein the copying of the first piece of the data teaches the machine learning agent the location of the data source and the first type of the first piece of the data.

In another implementation, the present disclosure is directed to a machine-readable storage medium containing machine-executable instructions for implementing a mixed-initiative message augmenting agent system for augmenting like messages with information pertinent to the like messages. The machine-executable instructions include: a first set of machine-executable instructions that implement a buildand-demonstrate module that allows a user to create a form by retrieving information pertinent to a first one of the like messages; a second set of machine-executable instructions that implement an augmentation-repair module that allows the user to repair mixed-initiative message augmenting agent system; and a third set of machine-executable instructions that implement a learning algorithm that teaches a machine-learning agent to augment subsequent ones of the like messages as a function of at least one of 1) the retrieving of the information pertinent to the first one of the like messages and 2) the repair of the mixed-initiative message augmenting agent system.

In still another implementation, the present disclosure is directed to a system that includes: a machine-readable storage medium containing machine-executable instructions for implementing a mixed-initiative message augmenting agent system for augmenting like messages with information pertinent to the like messages; and a processor for executing the machine-executable instructions so as to implement: a build-and-demonstrate module that allows a user to create a form by retrieving information pertinent to a first one of the like messages; an augmentation-repair module that allows the user to repair mixed-initiative message augmenting agent system; and a learning algorithm that teaches a machine-learning agent to augment subsequent ones of the like messages as a function of at least one of 1) the retrieving of the information pertinent to the first one of the like messages and 2) the repair of the mixed-initiative message augmenting agent system.

In yet another implementation, the present disclosure is directed to a method of performing a join between database reports stored on one or more machine-readable media. The method includes: navigating to a first database report; navigating to a second database report; and automatedly performing an n-to-m join on data within the first and second database reports without prior agreement to column types on which to base the n-to-m join, wherein each of n and m is a positive integer equal to or greater than 1 and at least one of n and m is greater than 1.

In still yet another implementation, the present disclosure is directed to a machine-readable storage medium containing machine-executable instructions for performing a method of performing a join between database reports stored on one or more machine-readable media. The machine-executable instructions include: a first set of machine-executable instructions for navigating to a first database report; a second set of machine-executable instructions for navigating to a second database report; and a third set of machine-executable instructions for performing an n-to-m join on data within the first and second database reports without prior agreement to column types on which to base the n-to-m join, wherein each of n and m is a positive integer equal to or greater than 1 and at least one of n and m is greater than 1.

In a further implementation, the present disclosure is directed to a system that includes: a machine-readable storage medium containing a wrapper program comprising: a first set of machine-executable instructions for navigating to a first database report; a second set of machine-executable instructions for navigating to a second database report; and a third set of machine-executable instructions for performing an n-to-m join on data within the first and second database reports without prior agreement to column types on which to base the n-to-m join, wherein each of n and m is a positive integer equal to or greater than 1 and at least one of n and m is greater than 1; and a processor for executing the first, second, and third sets of machine-executable instructions so as to perform the n-to-m join using the first and second database reports.

In still another implementation, the present disclosure is directed to a method of implementing a mixed-initiative machine-learning agent system. The method includes: storing a plurality of machine-learning agents; receiving a request for accessing a data source; and in response to receiving the request, displaying to a user via a machine display all of the plurality of machine-learning agents associated with the data source.

In another implementation, the present disclosure is directed to a machine-readable storage medium containing machine-executable instructions for implementing a method of implementing a mixed-initiative machine-learning agent system. The machine-executable instructions include: a first set of machine-executable instructions for storing a plurality of machine-learning agents; a second set of machine-executable instructions for receiving a request for accessing a data source; and a third set of machine-executable instructions for displaying to a user via a machine display all of the plurality of machine-learning agents associated with the data source in response to receiving the request.

In still another implementation, the present disclosure is directed to a system that includes: a machine-readable storage medium containing a machine-executable instructions for providing a machine-learning build-and-demonstrate user interface, the machine-executable instructions comprising: a first set of machine-executable instructions for storing a plurality of machine-learning agents; a second set of machine-executable instructions for receiving a request for accessing a data source; and a third set of machine-executable instructions for displaying to a user via a machine display all of the plurality of machine-learning agents associated with the data source in response to receiving the request; and a processor for executing the first, second, and third sets of machine-executable instructions so as to display all of the ones of the plurality of machine-learning agents associated with the data source corresponding to the request.

In yet another implementation, the present disclosure is directed to a method of teaching a machine-learning agent. The method includes: receiving an instruction to automatedly fill a machine-learning-agent report; in response to receiving the instruction, automatedly filling the machine-learning-agent report; and after automatedly filling the machine-learning-agent, automatedly recording one or more actions a user takes to resolve an issue with the automated filling of the machine-learning-agent report.

In still yet another implementation, the present disclosure is directed to a machine-readable storage medium containing machine-executable instructions for implementing a method of teaching a machine-learning agent. The machine-executable instructions include: a first set of machine-executable instructions for receiving a request to automatedly fill a machine-learning-agent report; a second set of machine-executable instructions for automatedly filling the machine-learning-agent report in response to receiving the request; and a third set of machine-executable instructions for automatedly recording one or more actions a user takes to resolve an issue with the automated filling of the machine-learning-agent report.

In a further implementation, the present disclosure is directed to a system that includes: a machine-readable storage medium containing a machine-executable instructions for providing a machine-learning build-and-demonstrate user interface, the machine-executable instructions comprising: a first set of machine-executable instructions for receiving a request to automatedly fill a machine-learning-agent report; a second set of machine-executable instructions for automatedly filling the machine-learning-agent report in response to receiving the request; and a third set of machine-executable instructions for automatedly recording one or more actions a user takes to resolve an issue with the automated filling of the machine-learning-agent report; and a processor for executing the first, second, and third sets of machine-executable instructions so as to allow the user to resolve the issue with the automated filling of the machine-learning-agent report

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 is a screenshot of an email message augmented using a particular embodiment of a MIMAA system of the present disclosure;

FIG. 6A is a partial screenshot of one example of an alternative build-and-demonstrate user interface of the present invention, illustrating an initial copying of data by a user to the message-augmentation form displayed in the interface;

FIG. 6B is a partial screenshot of the build-and-demonstrate user interface FIG. 6A, illustrating automated population of the message-augmentation form;

FIG. 6D is a screenshot of the build-and-demonstrate user interface of FIG. 6A, illustrating the completed message-augmentation form.

DETAILED DESCRIPTION

Figure 1:
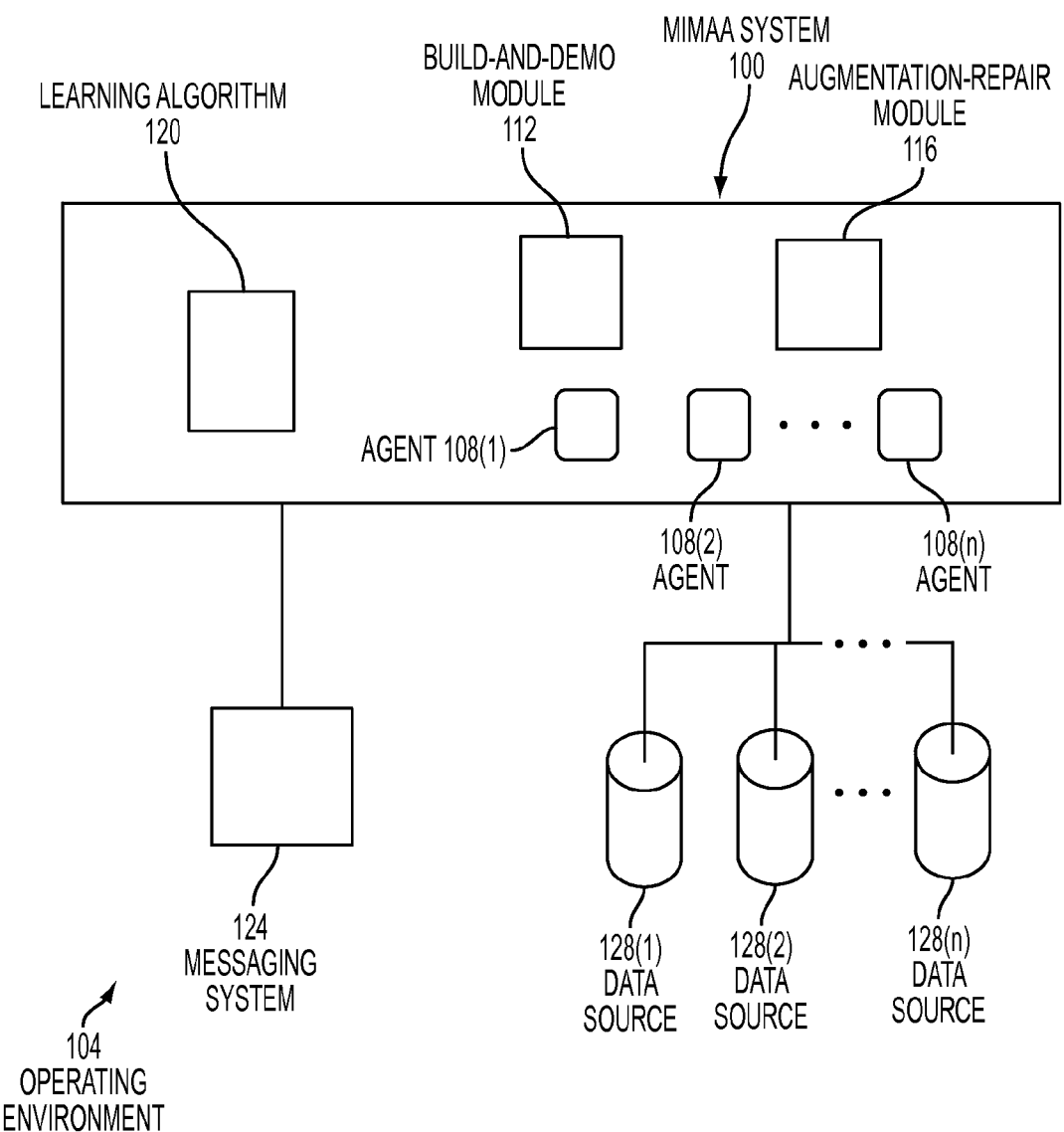
FIG. 1 is a high-level diagram of a mixed-initiative message augmenting agent (MIMAA) system of the present invention, illustrating the MIMAA system in an operating environment.

Referring now to the drawings, FIG. 1 illustrates a mixed-initiative message-augmenting agent (MIMAA) system 100 of the present invention in an operating environment 104 that allows the functionality of the MIMAA system to be utilized. As described below in detail, MIMAA system 100 allows, among other things, a human agent to create one or more machine-learning agents 108(1)-108(n) for incoming requests or messages, such as email messages, that augment the requests or messages with information relating to the content of the messages. Once a human agent has created one or more machine-learning agents, such as machine-learning agents 108(1)-108(n), for messages of a particular type, MIMAA system 100 can automatically identify from the message which machine-learning agent(s) to use to augment each message of that type with the corresponding information.

As an example, FIG. 2 illustrates an augmented email message 200 that MIMAA system 100 of FIG. 1 has augmented with various forms, here forms 204, 208 containing information pertinent to the subject matter of the original email message 212. In this example, original email message 212 is a message from a university police officer to a university administrator notifying the administrator that a student was injured in a university building and was transported to a local hospital for treatment. In a conventional scenario, i.e., without having the benefit of MIMAA system 100, after being alerted to this incident, the administrator would take a variety of actions, including, at the student's request, emailing each of the student's instructors to inform them of the situation. Simply gathering the information required for a response takes the administrator and administrative staff up to three hours. One reason this task takes so long can be seen by looking at what is required in notifying faculty. In this example, the university's information system has no report that lists the email addresses of a student's instructors as this is not a core task of admitting and matriculating students. Instead, the administrator's staff first obtains the list of the 6 to 8 courses that the student is enrolled in. From that list they access another report that lists the instructor's name for each course. Finally, they look up the email addresses of the instructors individually.

However, when MIMAA system 100 of FIG. 1 is implemented, the MIMAA system can generate augmented email 200 (FIG. 2) with forms 204, 208 automatically after the MIMAA system has been trained to respond to this type of message, i.e., a message reporting hospitalization of a student. After MIMAA system 100 has been trained for this type of message, the time the administrator and/or staff must devote to this email can be reduced from multiple hours to augment original email 212 using conventional methods to several minutes or less in reviewing augmented email 200 to check that MIMAA system 100 has populated forms 204, 208 appropriately.

With example augmented email message 200 of FIG. 2 as a backdrop, MIMAA system 100 of FIG. 1 includes a build-and-demonstrate module 112 (e.g., user interface and supporting software instructions) that allows a human agent (e.g., the administrator or staff in the foregoing example) to establish one or more message-augmenting forms, here, forms 204, 208 and to teach the corresponding machine-learning agent(s) 108(1)-108(n): 1) the location(s) of the source(s) of the information for populating each form and 2) the type(s) of data for populating each form. Further details of exemplary build-and-demonstrate modules are described below.

Because any of a variety of reasons, a machine-learning agent 108(1)-108(n) might make an error in populating a form of an augmented email. Consequently, in this example, MIMAA system 100 includes an augmentation-repair module 116 (e.g., user-interface and supporting software instructions) that allows a human agent (e.g., the administrator or staff in the foregoing example) to correct the error(s) that the corresponding machine-learning agent 108(1)-108(n) is making. In the example of augmented email message 200 of FIG. 2, the augmented email message includes a control 216, here a hyperlink denoted "Repair the Form," that allows a human agent to access the functionality of augmentation-repair module 116. Using augmentation-repair module 116, the human user can correct the errors made by the corresponding machine-learning agent 108(1)-108(n). As described below, a learning algorithm 120 (FIG. 1) of MIMAA system 100 is beneficially adapted to learn from the corrections made using augmentation-repair module 116.

In the example of FIG. 2, in addition to control 216 for activating augmentation-repair module 116, augmented email 200 includes two additional controls, i.e., controls 220, 224 that supplement the learning of the corresponding machine-learning agent 108(1)-108(n). Control 220 is a hyperlink denoted "Mark this Form as OK" for allowing a human agent to indicate to MIMAA system 100 (FIG. 1) that the corresponding machine-learning agent 108(1)-108(n) populated forms 204, 208 correctly. In this example, learning algorithms 120 in configured so that the selection of control 220 by a human agent teaches the corresponding machine-learning agent 108(1)-108(n) that the machine-learning agent populated forms 204, 208 correctly. Control 224 is a hyperlink denoted "Attach Other Forms" for allowing a human agent to augment augmented email 200 with one or more forms other than forms 204, 208. In one example, a selection of control 224 by a human agent causes learning algorithm 120 to recognize that future emails of a type identical to the type of original email 212 should be augmented with the selected additional form(s). In another example, a selection of control 224 by a human agent will not affect the knowledge of learning algorithm 120, but rather is used for exceptions that are not part of the routine machine-learning agent process.

Operating environment 104 includes a messaging system 124, which oversees the primary messaging functionalities of receiving and sending messages and may also provide other functionality, such as allowing a user to compose, organize, and archive messages and to add controls 216, 220, 224 to augmented email 200, among others. Examples of types of messaging systems that messaging system 124 can be include email applications, such as simple mail transfer protocol (SMTP) applications, and other text-based messaging applications, such as instant-message (IM) applications and short message service (SMS) applications, among others. Those skilled in the art will understand the variety of messaging systems with which MIMAA system 100 of the present application can be used.

Operating environment 104 also includes one or more data sources 128(1)-128(n) that contain information that machine-learning agents 108(1)-108(n) use to augment various messages. As will become clearer from further examples provided below, each data source 128(1)-128(n) can be virtually any machine-accessible (e.g., computer-accessible) source of information, such as, but not limited to, extensible markup language (XML) database management systems, such as those based on XQuery protocols, relational database management systems, such as those based on structured query language (SQL) protocols, object database management systems, such as those based on object query language (OQL) protocols, and Internet resources, such as structured documents, for example Web pages. Those skilled in the art will readily appreciate the wide variety of sources of information that can be available to machine-learning agents 108(1)-108 (n) for populating forms for augmenting messages.

Figure 3:
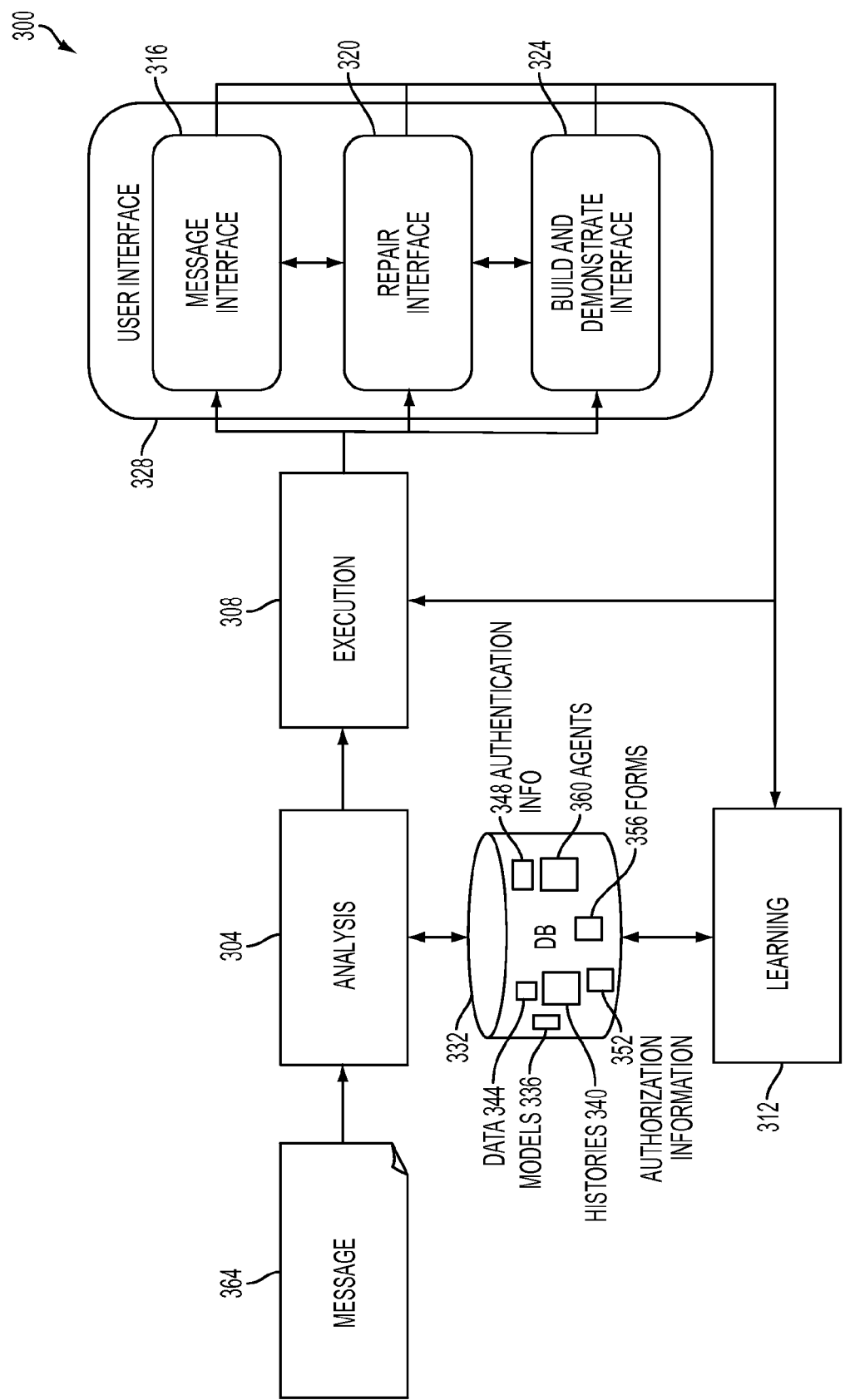
FIG. 3 is a diagram illustrating components of another particular embodiment of a MIMAA system of the present disclosure and flow of data therethrough.

Referring now to FIG. 3, this figure provides an overview of an MIMAA system 300 made in accordance with the present invention that can be used, for example, as MIMAA system 100 of FIG. 1. In this example, MIMAA system 300 of FIG. 3 contains two main categories of components: computational components 304, 308, 312, which are illustrated by rectangles having sharp edges, and user-interface components 316, 320, 324, which are illustrated by rectangles having rounded edges. In the present embodiment, individual user-interface components 316, 320, 324 are visualized in a combined single interface 328 for convenience. That said, those skilled in the art will readily appreciate that user-interface components 316, 320, 324 need not be visualized in this manner. In this embodiment, MIMAA system 300 also includes a database 332 to record, for example, machine-learning models 336, histories 340 of interactions between human agents and the MIMAA system, data 344 for training machine-learning, authentication information 348, authorization information 352, declared and demonstrated forms 356, learned machine-learning agents 360, and other information used and/or created by the MIMAA system. In this example, database 332 also accesses application data.

The process is started with an incoming message 364 being sent to analysis component 304. Analysis component 304 runs appropriate ones of machine-learning models 336 that classify message 364 and associate that classification with a set of one or more machine-learning agents 360, records in the application, and extracted data for demonstrated forms 356. In addition to machine-learning models 336, MIMAA system 300 may also execute ad-hoc programs to recognize the same information. MIMAA system 300 then passes message 364 and the results of the analysis thereof performed by analysis component 304 to execution component 308, which executes relevant one(s) of machine-learning agents 360 associated with the message. MIMAA system 300 presents the results of the analysis and execution to a human agent through user interface 328.

As mentioned above, in this example MIMAA system 300 has three main user interfaces that are visually combined in FIG. 3 into combined user interface 328: (i) message interface 316, which displays the information the relevant one(s) of machine-learning agents 360 has/have retrieved for this task; (ii) repair interface 320, which allows a human agent to repair any errors the machine-learning agents has/have made in retrieving the information; and (iii) build-and-demonstrate interface 324 which allows a human agent to declare and visually organize the information they want each machine-learning agent to retrieve, and where the human agent demonstrates where the machine-learning agent should find the information.

After a human agent has finished with user interface 328, MIMAA system 300 again sends message 364 to analysis component 304 and the corresponding one(s) of user-interactions histories 340 to execution component 308. In this case, the execution component 308 executes the relevant one(s) of machine-learning agents 360 or may execute additional ad-hoc programs. MIMAA system 300 then forwards the same information to learning component 312, which uses this information to augment training data for machine-learning agents 360 via domestication. Learning component 312 then trains new machine-learning models 336 and stores them in database 332.

MIMAA system 300 allows a human agent to create a new machine-learning agent in response to the human agent recognizing a task in an incoming message, such as message 364, that could be improved with the automatic retrieval of supporting information. For example, a human agent can transition from the triggering message to build-and-demonstrate interface 324. Here, as described above relative to FIGS. 1 and 2, a human agent builds one or more forms that lay out the structure of the information to be reported by the corresponding one(s) of machine-learning agents 360. In one example, a human agent builds each form by placing form elements, which can resemble, but are not the same as, conventional database fields. A human user is free to name these elements anything desired, and the elements initially have no logical connection to the underlying data source(s) (not shown, but see, e.g., sources 128(1)-128(n) of FIG. 1) from which the machine-learning agent 360 will obtain the augmenting information. It is through demonstration that each machine-learning agent 360 learns to associate content to be reported in the augmenting form(s) with information retrieved from one or more data sources.

Figure 4:
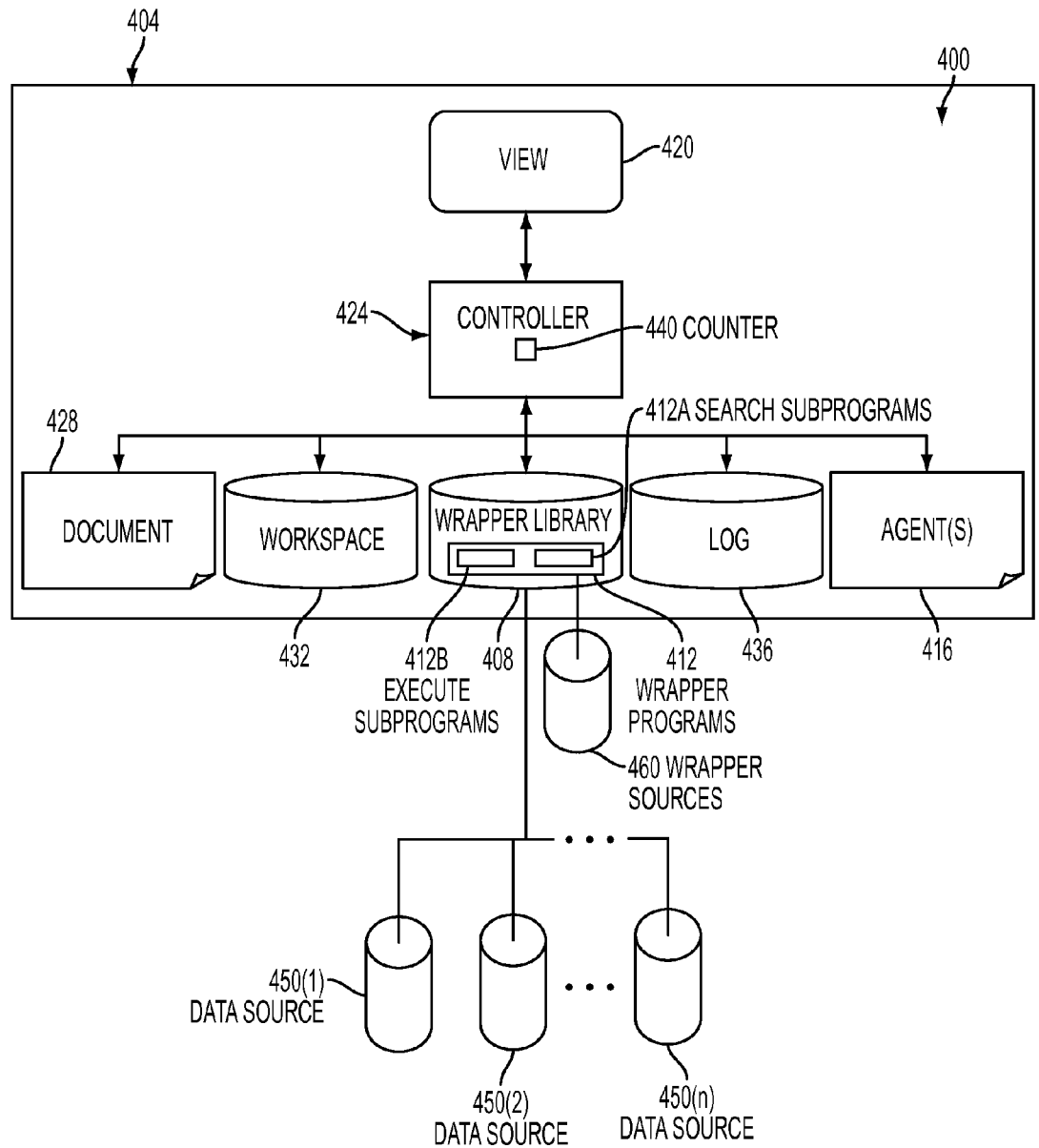
FIG. 4 is a diagram illustrating functional details of a particular embodiment of a build-and-demonstrate module of the present invention configured for retrieving augmenting information from structured documents.
Figure 5:
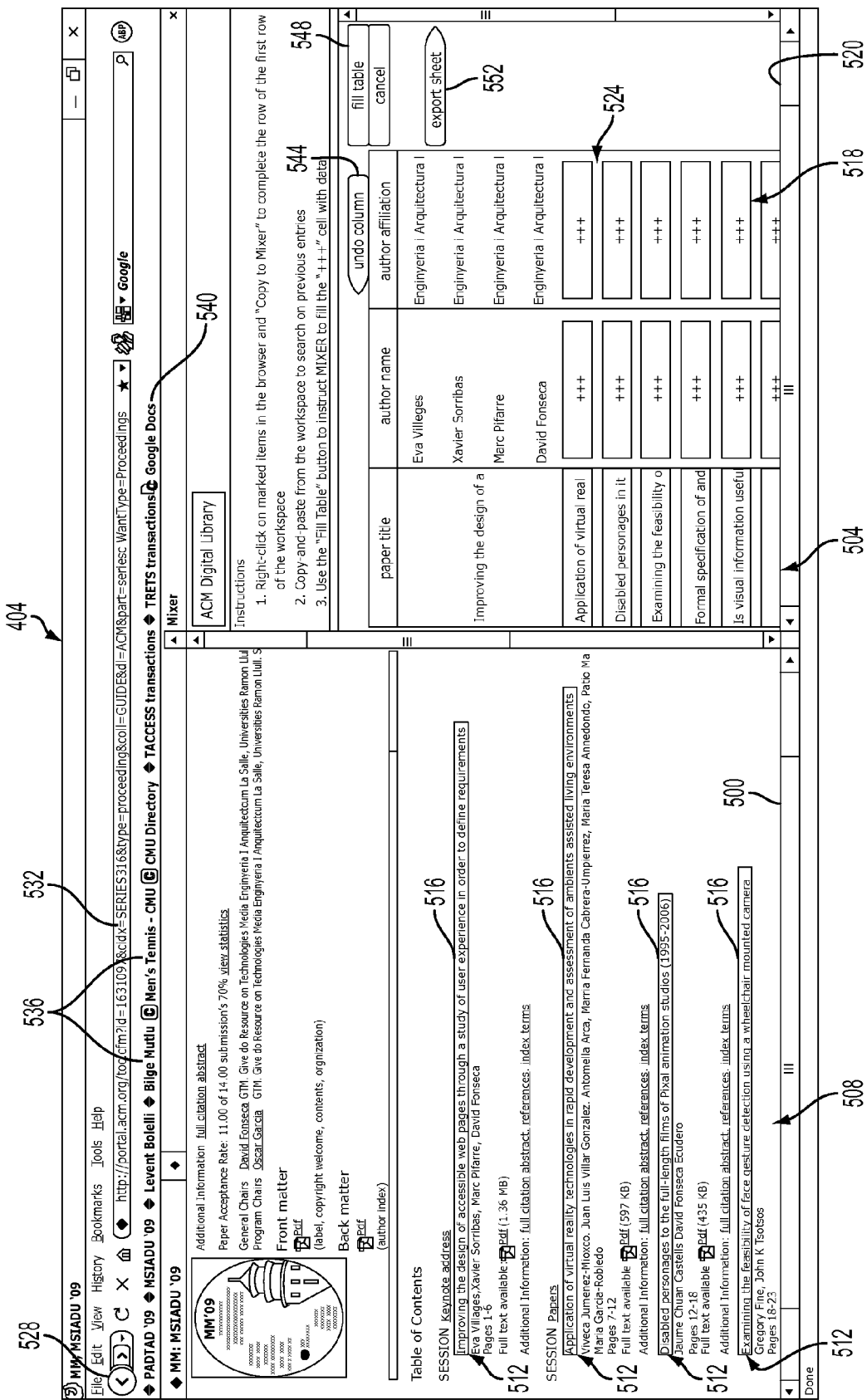
FIG. 5 is a screenshot of the particular build-and-demonstrate interface of FIG. 4 implemented in a web browser.

Referring now to FIGS. 4 and 5, FIG. 4 illustrates an embodiment of a build-and-demonstrate module 400 that is particularly adapted for use in building forms that utilize information collected from websites via structured documents of those sites. Build-and-demonstrate module 400 utilizes various concepts of workflow-by-example (WbE) machine-learning protocols, such as the WbE protocols disclosed in U.S. Patent Application Publication No. 2010/0037127, published on Feb. 11, 2010, and titled "Apparatuses, Systems, And Methods To Automate A Procedural Task," which is hereby incorporated by references for all teachings of WbE protocols and processes applicable to build-and-demonstrate module 400 as recognized by those skilled in the art. Build-and-demonstrate module 400 applies WbE protocols to the creation and execution of machine-learning agents, such as agents 108(1)-108(n) of FIG. 1, utilizing hypertext markup language (HTML) and hypertext transfer protocol (HTTP) access points to the source data. A particularly powerful feature of build-and-demonstrate module 400 is its ability to combine information from multiple data sources, here webpages.

In this example, build-and-demonstrate module 400 is embedded as a plug-in program to a web browser 404. In other embodiments, build-and-demonstrate module 400 can be incorporated as a built-in feature of a web browser, provided as a standalone application, or incorporated into an MIMAA system application, among other variations. Build-and-demonstrate module 400 includes a wrapper library 408, which stores wrapper programs 412 for a collection of websites (not shown) that are used to form a machine-learning agent 416 for a particular task required by a particular incoming message (not shown, but see, e.g., message 364 of FIG. 3). Wrapper programs 412 are used to extract message-augmenting information from structure documents (e.g., webpages) on those websites. Wrapper programs 412 correspond to analysis component 304 of FIG. 3. Wrapper programs 412 can also be used to populate forms required by other components of an MIMAA system of which build-and-demonstrate module 400 is a part, such as the message analyzer (not shown), which can be implemented using the virtual information officer (VIO) concepts disclosed in U.S. Pat. No. 7,672,908 issued on Mar. 2, 2010, to Tomasic et al. and titled "Intent-Based Information Processing And Updates In Association With A Service Agent." The '908 patent is hereby incorporated by reference for its teachings of VIO concepts relevant to MIMAA systems of the present disclosure. In one embodiment, wrapper programs 412 are associated with corresponding respective websites using a pointer table that associates the uniform resource locators (URLs) of the websites with identifiers that identify the wrapper programs.

Build-and-demonstrate module 400 also includes a view component 420, which is responsible for visualizing, via browser 404, information to a human agent and accepting inputs from the human agent. A controller 424 controls the actions taken on a particular input from the human agent or the Internet. A document component 428 of build-and-demonstrate module 400 provides a view of the current structured document in browser 404. This is seen in browser 404 in FIG. 5 in which a left-hand pane 500 of a browser window 504 is displaying a structured document 508 containing information that includes titles 512 of a keynote address and papers presented at a particular conference. Controller 424, in conjunction with document component 428, allows the human agent to select various information from structured document 508 (FIG. 5). Structured document 508 is generated by accessing a data source 450(1) . . . 450(n) via a wrapper program in set of wrapper programs 412. As seen in FIG. 5, a human agent has selected titles 512, as indicated by highlighting 516. Build-and-demonstrate module 400 of FIG. 4 also includes a workspace component 432 that provides the module with functionality that allows a human agent to build forms. Workspace component 432 is visualized in browser window 504 of FIG. 5 as a workspace 518 appearing in a right-hand pane 520 of the window. In this embodiment, workspace 518 contains a form, here, table 524, that the human agent creates and populates by taking various actions using the workspace component and document component 428 in corresponding respective panes 520, 500, for example, as described below. A log component 436 (FIG. 4) of build-and-demonstrate module 400 logs, under control of controller 424, actions that the human agent takes within both panes 500, 520 (FIG. 5) using corresponding respective document and workspace components 428, 432. Examples of actions logged by log component 436 (FIG. 4) include, but are not limited to, navigations to various structured documents, such as document 508 of FIG. 5) where the human agent selects data to be copied to table 524 (FIG. 5), and selections of data to be copied to the table. As an example of the former, log component 436 logs the URL of the structured document from which a human agent selects data. As an example of the latter, log component logs the data type of the selected data, such as an HTML data type, that is specified in the structured document. Controller 424 (FIG. 4) uses this logged information in various ways, such as to create wrapper programs 412 so that they know what data to copy from a particular structured document and to create machine-learning agent 416 so that it knows the location of one or more sources of data for augmenting a particular message.

In one example, build-and-demonstrate module 400 (FIG. 4) executes one of wrapper programs 412 corresponding to structured document 508 (FIG. 5). That wrapper program 412 identifies a (nested) set of entities, attributes, and values in structured document 508. For example, a data table within a structured document can be modeled in this way. Each row of the table is an entity, the columns of the table are attributes, and the data in the table are values. The entire table is a set of entities. A list of bibliographic entries, such as the list appearing in structured document 508 in left-hand pane 500 (FIG. 5) of browser window 504 can also be modeled this way. Each main entry is an entity. Attributes correspond to the different entries in the bibliographic reference. The values are the specific data of the entries. The list of entries is a set of entities.

Wrapper programs 412 can be created by developers and added to a wrapper source, such as wrapper source 460. Multiple wrapper sources (not shown) are also possible. In this embodiment, each wrapper program 412 typically includes a pair of subprograms, a search subprogram 412A and an execute subprogram 412B. In one example, each search 412A subprogram takes a URL of a structured document 508 as an input and returns an assessment of the that structured document, such as "accept" or "reject", as an output. Each execute 414 subprogram takes as input a structured document 508 and returns a (nested) set of entities, attributes, and values. To determine which wrapper program 412 corresponds to a particular structured document 508, controller 424 submits every structured document URL to every search subprogram 412A in wrapper source 460. If a search subprogram 412A returns "reject", wrapper program 412 having that search subprogram 412A is ignored. If a search subprogram 412A returns "accept", then structured document 508 corresponding to that URL is submitted to the corresponding execute subprogram 412B of that wrapper program 412. That execute subprogram 412B then "wraps" that structured document 508 with additional data.

In this example, build-and-demonstrate module 400 (FIG. 4) visualizes structured document 508 (FIG. 5) in left-hand pane 500 with highlighting 516 on elements, here, titles 512, to indicate recognized entities, attributes, and values from the corresponding one of wrapper programs 412. Like the example above, controller 424 (FIG. 4) logs the URL of structured document 508 in log component 436.

A human agent interacts via browser 404 with structured document 508 (FIG. 5) and workspace 518. With structured document 508, the human agent has several choices, such as to: navigate using a link on the document, use a widget (to fill in a text field, to select from a drop-down menu, etc.), use a back button 528, or selecting a highlighted element, such as any of titles 512 indicated by highlighting 516. For navigation, as mentioned above, controller 424 (FIG. 4) records the navigation in log component 436 and in machine-learning agent 416. Execution of a navigation in a wrapper program 412 simply performs navigation to the appropriate structured document on behalf of the human agent. Navigation can occur, for example, by selecting a link on structured document 508, entering a new URL in address bar 532, or selecting a bookmark, such as any of bookmarks 536 on bookmark bar 540. For using a widget, controller 424 (FIG. 4) logs the use of the widget in log component 436 and inserts a loop construct into machine-learning agent 416. When build-and-demonstrate module 400 executes machine-learning agent 416, the loop construct iterates over the source of the interaction with the widget, filling in the appropriate value for a text field, selecting the correct drop down, etc. The source is identified by examining log component 436 and workspace component 432. For back button 528 (FIG. 5), controller 424 (FIG. 4) records the human agent's use of the button in log component 436 and in machine-learning agent 416. Execution of the back instruction in wrapper program 412 performs the corresponding action of navigating to the structured document viewed in left-hand pane 500 (FIG. 5) just prior to viewing the current structured document, here document 508. For selecting a marked-up element, controller 424 (FIG. 4) logs in log component 436 the addition of the entity column to table 524 in workspace 518 (FIG. 5) that corresponds to the highlighted element, inserts the wrapped information from the structured document into the table (when this information does not already occur in the table), and marks that column of the table for visualization.

For interacting with build-and-demonstrate module 400 (FIG. 4) from within workspace 518 (FIG. 5), the human agent can choose from among a set of "undo", "fill table", and "export sheet" controls, here, corresponding respective soft buttons 544, 548, 552. In the case of "undo" button 544, controller 424 (FIG. 4) backs out the addition of the last entity column added to table 524 from log component 436 and removes its visualization from workspace 518. If this undo process removes the last column associated with the particular wrapped structured document, the corresponding loop is removed from machine-learning agent 416. For the case of "fill table" button 548, controller 424 executes, as described below. For "export sheet" button 552, controller 424 exports the contents of workspace 518 to a file, a spreadsheet, an on-line spreadsheet service, email, etc.

To execute machine-learning agent 416, controller 424 creates an initial execution environment that includes a program counter 440 that points to the first step in the agent. Controller 424 then executes an action that depends on the current step of program counter 440. Each execution of an action is a function call to the action. The action then recursively calls machine-learning agent 416.

In the case that the step is a navigation action, machine-learning agent 416 performs the navigation corresponding to the navigation recorded in log component 436. Once the corresponding structured document is fetched, the corresponding one of wrapper programs 412 for that document is invoked. If no wrapper program 412 is available, controller 424 stops execution of machine-learning agent 416 and permits the human agent to mark up the structured document with the data to be copied from the structured document to workspace 518 (FIG. 5).

In the case that the current step of machine-learning agent 416 is the use of a widget, the program interacts with the widget by using the loop construct described above. It sets a pointer to the current element of the source of the interaction, sets the value of the widget appropriately, and continues to recursively call itself to execute the rest of the program, as normal. When this recursive call completes, the pointer to the current element is advanced, and the loop construct continues with the new element. When no more elements exist, the loop construct finishes and returns.

If the current step of machine-learning agent 416 is the end of the log in log component 436, the program simply returns, causing the next step of any parent loop construct to continue. The overall effect of machine-learning agent 416 is to execute the same set of human agent actions that a user would execute if the human agent repeatedly manually performed the steps in the program for every row of the entities that are extracted from structured documents by the corresponding respective wrapper programs. As someone skilled in the art can readily understand, this embodiment of the MIMAA system can be readily extended to manage multiple agents. The extension first allows users to save and name agents as an option on the workspace. And second, when a wrapper fetches a document from a data source, the workspace lists the names of agents that utilize that data source.

Through program execution, the MIMAA system constructs a join result in a new table visualized in workspace 518 from, at least, two input tables A and B constructed from structured documents 508 and a particular column of tables A and B selected by the user from data in those columns, such as title 512. As those skilled in the art will readily appreciate, these tables are typically stored as database tables in one or more databases and are typically visualized to a user in one or more structured documents or other database report(s). The join operation is fundamental because it is equivalent to a form of logical deduction. As a generic example, suppose table A has two columns, "name" and "gender". Suppose further that table B has two columns "name" and "phone number". The join of tables A and B on the "name" column is a new table C with three columns "name", "gender", and "phone number". Each row of the new table C is constructed by combining all rows of table A and any row of table B having the same value in the name cell (the value for that row of the name column).

There are a wide variety of joins, but here we are concerned with the repetition of values in the "name" cells for both tables A and B. If every cell in the "name" column is unique in table A and unique in table B, then the join will be 1-to-1 because a name cell in table A can have the same value of exactly zero or one name cells in table B. If a value in a name cell occurs in both tables A and B, there will be a corresponding row in the join table C. If a value of a name cell does not occur in tables A and B, there will be no corresponding row. For example, if A={(John, male), (Jane, female)} and B={

(John, 412 555 1212), (Mary, 412 555 1313)} then C={(John, male, 412 555 1212)}. If every cell in the "name" column is unique in table A but may repeat in table B, then the join will be a 1-to-n because a name cell in table A may have the same value of multiple rows in table B. If a value in a name cell occurs in both table A and n rows of table B, there will be n corresponding rows in the join table C.

If a value of a name cell does not occur in both table A and table B, there will be no corresponding row. For example, if table A={(John, male), (Jane, female)} and table B={(John, 412 555 1212), (John, 412 555 1414), (Mary, 412 555 1313)} then table C={(John, male, 412 555 1212), (John, male, 412 555 1414)}.

Finally, by direct extension, if the same value occurs multiple times in both of tables A and B, then the join will be n-to-m because name cells in n rows in table A may have the same value as name cells in m rows in table B, resulting in n*m rows in table C. For example, if table A={(John, male), (John, female), (Jane, female)} and table B={(John, 412 555 1212), (John, 412 555 1414), (Mary, 412 555 1313)} then table C={(John, male, 412 555 1212), (John, male, 412 555 1414), (John, female, 412 555 1212), (John, female, 412 555 1414)}. In the prior art, it was possible to construct a program that performed 1-to-1 joins on any two data sources or n-to-m joins where two data-source wrapper programs agreed on the column to join on (the "name" in the example above). In contrast, in an MIMAA system of the present disclosure, wrapper programs 412 can construct n-to-m joins on independent data sources where no agreement occurs between the two wrappers for data sources. This simplification greatly reduces the labor required to use an MIMAA system of the present disclosure compared to prior art systems.

A key technological differentiation point for programming-by-example systems is the access point between the learning system and the backend application. In one embodiment of an MIMAA system of the present disclosure, the access point is the database connection between the application and the user interface. This access point has very high precision because each data value is typed with a data type. In another embodiment, such as an MIMAA system that includes build-and-demonstrate module 400 of FIG. 4 that interfaces with HTML-based structured documents, a useful access point is at the HTTP and HTML protocol levels. In such an embodiment, build-and-demonstrate module 400 captures HTML and HTTP interactions and modifies them for visualization and analysis. In the context of MIMAA system 100 of FIG. 1, with this access point each message received by messaging system 124 is an HTML document that arrives in response to an HTTP request. Capture and modification occurs in MIMAA system 100.

In another embodiment of an MIMAA system of the present disclosure, such as a particular embodiment of MIMAA system 100 of FIG. 1, the access point is the augmentation of the message format (such HTML or XML) by the producer of the message or an intermediary. This augmentation is designed to assist the human agent using the MIMAA system (i.e., the consumer of a message) in the interpretation of the message. Existing formats for this scenario (such as microformatting) demand that the producer of a message provide both correct syntax and semantics for any augmentation. For example, the microformat for a date specifies both the syntax of the date and the semantics of the date.

In contrast, in one embodiment of an MIMAA system of the present disclosure, for example, an embodiment that implements build-and-demonstrate module 400 of FIG. 4, only the syntax is specified. The semantics of the augmentation are left to the consumer of the message. This shift in responsibilities from producer to consumer makes a fundamental difference in the ability of the producer of the message to communicate with the consumer of the message since they need not agree a priori on the semantics of the data. The cost required to augment the data is significantly lowered for the producer. The cost to understand the data increases for the consumer, but the consumer can leverage their specific requirements to mitigate this cost. In particular, this embodiment of an MIMAA system of the present disclosure uses its machine-learning analysis and user interfaces (typically the repair component, e.g., augmentation repair module 116 of MIMAA system 100 of FIG. 1) to determine the semantics of the augmenting data.

In this embodiment, augmentation includes specifying entities, attributes, and values. Entities may be nested as values to attributes. An exemplary set of rules for the augmentation for this access point (called "nanosyntaxing") are as follows:

(1) Add tags around atomic literals. For example, for HTML, <z> tags are added to a table data entry like this: <td><z>George</z><z>Washington</z></td>. These tags specify the atomic elements of the data.

(2) Add <z> tags around groups of atomic literal values associated with an object. For example <z><td>George</td><td>Washington</td></z> for rows in a table. These tags allow literals to be grouped.

(3) Add attributes (also known as domains) to z tags, for example, <td><z attribute="firstname">George</z><z attribute="lastname">Washington</z></td>. In this case the attributes allow different sets of z tags to be distinguished, so, for example, "April," the month, can be distinguished from the name of a person with the name "April."

(4) Add z attributes to any element, as appropriate, where the value is the domain, e.g., <ul z="lastname">Washington </ul>

Note that nesting of elements allows for the automatic nesting of entities, attributes and values. These four rules combine to provide additional evidence to the analysis component. Note also that an MIMAA system of the present disclosure can be configured to accept tags added directly by the creator of the structured document data source (e.g., website developer), by an injection tool, by a proxy, or by machine learning attached to the user browser using, for example, the Yahoo!®, Pipes™ web composition tool (available from Yahoo! Inc., Sunnyvale, Calif.), a web data tool available from Fetch Technologies, El Segundo, Calif., or by some other method.

Relating this nanosyntaxing embodiment to the example of FIG. 4, it is noted that there can be a generic wrapper program 464 in the wrapper source 460 that recognizes nanosyntax structured documents and wraps such a structured document based on the nanosyntax information. This generic wrapper allows a data source 450 (1) . . . 450 (n) to interact with MIMAA without the need for the addition of a wrapper program 412 for that particular data source 450 (1) . . . 450 (n).

Figure 6C:
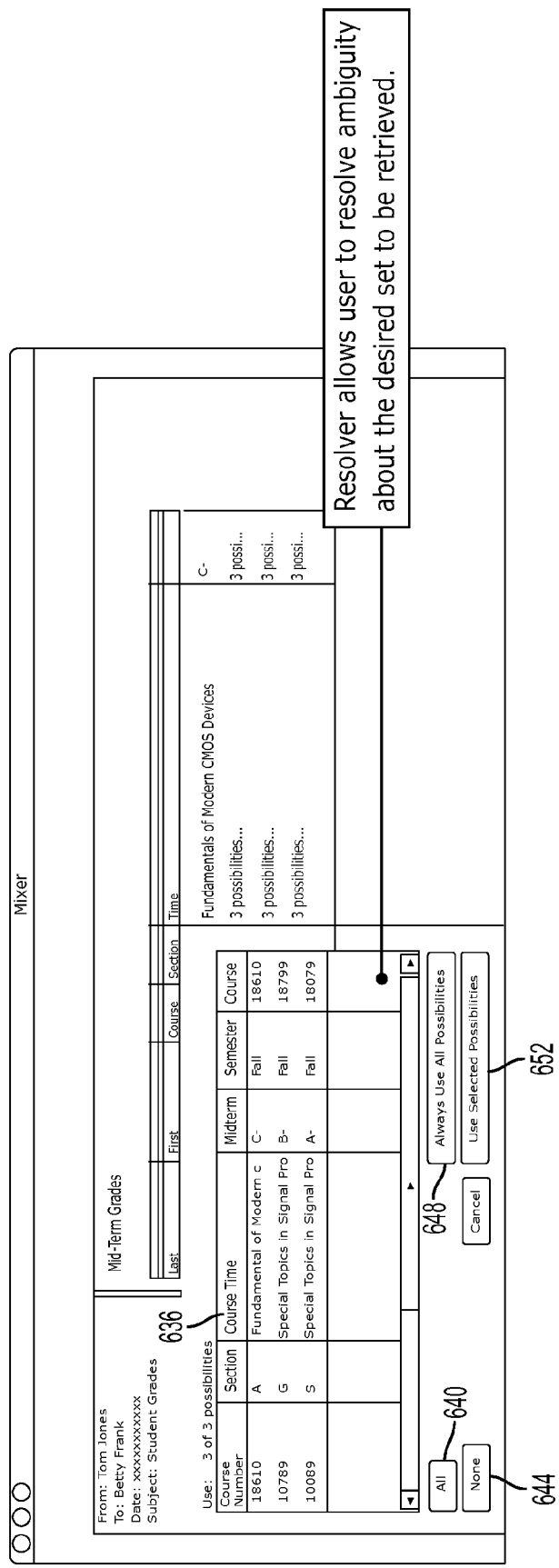
FIG. 6C is a partial screenshot of the build-and-demonstrate user interface of FIG. 6A, illustrating a resolver feature of the interface that allows a user to resolve ambiguity in information for populating the message-augmentation form.

FIGS. 6A-D illustrate another example of a user interface 600 that implements build-and-demonstrate functionality of an MIMAA system of the present disclosure, such as MIMAA system 100 of FIG. 1. Referring now to FIG. 6A, in this example interaction with user interface 600 is initiated when a human agent receives an incoming email 604 that requires an information-retrieval task they want to automate. For convenience, user interface 600 displays email 604 in a left-hand pane 608 of a window 612 of the user interface, which in this example is window-based. While not shown, the human agent may initiate user interface 600 by clicking a link embedded in email 604, such as an "Attach Form" control similar to "Attach Other Forms" hyperlink 224 of FIG. 2. When the human agent selects such a control in this example, the build-and-demonstrate module (not shown) of the MIMAA system displays email 604 in left-hand pane 608 of user-interface window 612 and a workspace 616 containing various tools for form building and demonstrating in a right-hand pane 620.

Initially, the build-and-demonstrate module opens user interface 600 so that workspace 616 contains a new form 624 having one row and column. To add columns, the human agent drags the right edge 624A of form 624 to the right. Dragging right edge 624A to the left removes columns. In this embodiment, only one row is available to receive demonstrated data values. The human agent can title form 624, add labels to column headers 624B, and demonstrate data-value retrieval by visiting various data sources (not shown, but see, e.g., data sources 128(1)-(n) of FIG. 1) and copying and pasting the desired data into corresponding respective cells 624C of the form. The underlying machine-learning agent (not shown, but see, e.g., controller 424, log component 436, and machine-learning agent program 416 of FIG. 4) observes this interaction to train itself.

As seen in FIG. 6A, user interface 600 includes a "Fill In Table" soft button 628. At any time in the building and demonstration of one-row table 624, the human agent may actuate "Fill In Table" button 628. In response, the underlying machine-learning agent attempts to add rows to complete form 624 following the recorded procedure(s) the human agent used to populate the first row of the form, as described above. FIG. 6B is a screenshot of user interface 600 that shows the result of the human agent actuating "Fill In Table" soft button 628. Notice how table 624 contains multiple rows in FIG. 6B. The underlying machine-learning agent has filled all rows beyond the first row with either actual data values or a hyperlink 632 labeled "n possibilities" (n being the number of possibilities determined by the underlying machine-learning agent).

The underlying machine-learning agent displays hyperlink 632 in each of cells 624C for which the information to be displayed in that cell is ambiguous to the agent. To resolve such an ambiguity, the human agent selects the corresponding hyperlink 632, which causes user interface 600 to display a resolver 636, as shown in FIG. 6C. Resolver 636 allows the human agent to examine the multiple available results and specify whether they want form 624 to show a single item of the multiple results, a multiple-item subset of the available results, or all items of the results, in this example by providing various controls, such as controls 640, 644, 648, 652 (here soft buttons) labeled, respectively, "All", "None", "Always Use All Possibilities", and "Use Selected Possibilities". As those skilled in the art will readily appreciate, actuation of any one of these controls 640, 644, 648, 652 initiates a set of machine-executable instructions that provide the functionality conveyed by the corresponding label. In the example in FIG. 6C, the underlying machine-learning agent does not know which midterm grades the human agent wants included in form 624. The human agent could select in resolver 636 a single item, here, a class, (indicating they want grades from one class), multiple classes (e.g., in a specific department), or all of the classes in the list.

When the human agent is done constructing form 624 and resolving any ambiguity(ies) using resolver 636, user interface 600 displays the completed form 624, which is depicted in the screenshot of FIG. 6D. The human agent can then save form 624, thereby preparing the underlying machine-learning agent to automate this task. When a new email (not shown) arrives that is determined as being associated with the machine-learning agent just created in the foregoing example, the agent automatically appends form 624 to the bottom of the new email message and fills in the form with the information appropriate to the new email. If the new email contains a list of students that are different from the students of the "training" email corresponding to the building and demonstrating example described above, the underlying machine-learning agent can be taught to use the different names in retrieving the class/grade information desired to populate form 624.

The interaction design supports a piecemeal approach to specifying what a human agent wants. When the first triggering email arrives, a human agent can create a form specific to the task. As similar tasks arrive, a human agent can easily augment the form by adding or removing columns. These changes are then saved and reflected in future instances of the form. This allows human agents to address exceptions as they occur and not have to imagine every case as they design the initial form. It allows the form to evolve without forcing the human agent to start over with each minor variation in a task. The following are provided as further illustrative examples of these concepts.

As a first illustrative example, imagine that a person utilizing an MIMAA system of the present disclosure, such as MIMAA system 100 of FIG. 1, has started with a list of books as one of data source 128(1) . . . 128(n) and then built a table A in a build-and-demonstrate interface, such as interface 400 of FIG. 4, wherein they demonstrated a first book from the list and the price of this book from a second one of the data sources, here an Internet bookseller IB1. In one example, each of these data sources could be a structured document, such as a Webpage. The act of demonstrating how to obtain the prices of the books in the list causes a build-and-demonstrate controller, such as controller 424 of FIG. 4, to add programming steps to a corresponding machine-learning agent, such as one of agents 416 of FIG. 4, designated for retrieve book price information from bookseller IB1.

At some point in the future, the user might decide that they also want the price for each book in Table A from another bookseller, such as Internet bookseller IB2. In this example, the user could open table A (i.e., the machine-learning agent for getting book prices from bookseller IB1) in a build-and-demonstrate workspace, such as workspace 518 of FIG. 5) and extend this agent by adding an additional column where the user demonstrates getting the price from bookseller IB2. This demonstration for populating the additional column causes the build-and-demonstrate controller to add corresponding programming steps to the original table A machine-learning agent. This is one way to modify a machine-learning agent, i.e., by adding a column. In addition, the user may decide that they want to add bookseller IB1's shipping cost information to the table, so they could insert another new column between the columns for booksellers IB1, IB2$r$'s price and then demonstrate the shipping price for bookseller IB1 by copying and pasting the price for the book in the first row of this new column. By doing so, the build-and-demonstrate controller modifies the machine-learning agent by rebuilding the programmed steps of the agent from the previous state.

As another illustrative example, sometimes an existing machine-learning agent cannot find the information that a human agent has requested. For example, the human agent might be working from a list of names that they want email addresses for and the source list shows "Bob Jones". When the machine-learning agent follows the demonstrated example and looks up this name, it gets a null response, because the person is actually listed in the database as "Robert Jones". So the machine-learning agent fills out the whole table, but it places a "no response" message in the cell where Robert Jones' email address should be. In one example of an MIMAA system of the present invention, the human agent can fix this by selecting this "no response" cell and then demonstrating that when the machine-learning agent gets this type of response, it can proceed by looking up just the last name and not the whole name, and then selecting the email for "Robert" as equal to "Bob". Over time, the machine-learning agent will learn via a build-and-demonstrate controller, such as controller 424 of FIG. 4, the new strategy for using a piece of the subset of the data for a lookup. The machine-learning agent will learn the specific case that "Bob Jones" and "Robert Jones" are the same thing for these two datasets, and, given enough examples, it could even learn a general rule that "Bob" and "Robert" are synonymous.

In yet another illustrative example, when a user is expressing what information they are seeking to the agent by building and demonstrating a form, it is often difficult for the user to express the precision of the information they desire. Ambiguities can be resolved in two ways.

First, suppose a user is getting the prices of books from bookseller IB1 in the first illustrative example above, based on a list of books. The user demonstrates the first item to the machine-learning agent and then turn the agent free to fill out the rest of the list in accordance with concepts disclosed above, for example, relative to "Fill In Table" button 628 of FIG. 6. As the machine-learning agent is going row by row through the table and to the corresponding data source of bookseller IB1, it comes across a title that returns more than one price. In this example, a particular book title leads to a hardcover price and a softcover price, either of which can satisfy the price. This is ambiguous, and the machine-learning agent initially does not know how to resolve the ambiguity. In this example, a resolver, which can be the same as or similar to resolver 636 of FIG. 6, allows the machine-learning agent to indicate the ambiguity and allows the user to express what they want: for example, show all things (here, prices), show one thing (here, a particular one of the prices), or show a subset of things. If the user chooses and single thing, or a subset of all the things, then with enough examples, the machine-learning agent can learn the underlying rule of what precisely the user is looking for without the user having to specifically articulate the rule.

A second way to resolve an ambiguity is to allow a user to fix the ambiguity at the end of a build-and-demonstrate session. Say, for example, a user wants to know how many students from Portland attend a particular university. The user could demonstrate to a machine-learning agent in a build-and-demonstrate interface, such as interface 324 of FIG. 3, the first row of a table showing the student name and home city. Once the machine-learning agent has completed the table for all students, the user can sort the table by city, highlight all of the students from Portland and then teach the machine-learning agent that this subset is the subset that they want. In one example, this teaching of the machine-learning agent to recognize the subset from Portland could occur via a "Copy To Form" soft control in an MIMAA-system workspace, such as workspace 518. From this, the machine-learning agent learns that the user wants a subset and not the whole set, and it modifies the program accordingly to simply list students from Portland in a corresponding message-augmenting form.

Further illustrative examples illustrate benefits that can be achieved by storing machine-learning agents in a common database. In one such example, imagine one or more users of a particular instantiation of an MIMAA system of the present disclosure have created several machine-learning agents that automatically retrieve data from a data source of Internet bookseller IB1 from illustrative examples above. In this example, the MIMAA system can be configured so that when a user navigates to that data source, or if the user starts up the MIMAA system and then navigates to that data source, a user interface of the system will present to user all of the previously created machine-learning agents that use that data source. In effect, in this embodiment, the MIMAA system can anticipate that the user wants to reuse a machine-learning agent and surfaces a list of relevant agents as a way of speeding up the interaction.

This scheme can also be extended socially. With a central dataset of all machine-learning agents created by one or more instantiations of an MIMAA system of the present disclosure, a user could go to any data source that has one or more machine-learning agents associated with it and then immediately see those agents. As an example, an employee at a car manufacturer creates a machine-learning agent that connects a list of top-selling dealerships from one data source with dealer names and email addresses from a different data source. The employee is doing this to make it easier to send an encouraging email to dealerships doing good work. When another employee at the car manufacturer goes to the database containing the data on dealer performance and launches a user interface of an MIMAA system of the present disclosure, then the user interface would display the machine-learning agent made by the other employee that connects dealers with the dealer name and email address from the other database. This feature would make it much easier for multiple human agents to reuse machine-learning agents that other human agents have created.

It is to be noted that any one or more of the aspects and embodiments described herein may be conveniently implemented using one or more machines (e.g., one or more computing devices that are utilized as a user computing device and one or more server devices, such as a document server) programmed according to the teachings of the present specification, as will be apparent to those of ordinary skill in the computer arts. Appropriate software coding can readily be prepared by skilled programmers based on the teachings of the present disclosure, as will also be apparent to those of ordinary skill in the software arts. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk (CD), such as a readable, writeable, and/or re-writable CD; a digital video disk (DVD), such as a readable, writeable, and/or rewritable DVD), a magneto-optical disk, a read-only memory (ROM) device, a random access memory (RAM) device, a magnetic card, an optical card, a solid-state memory device (e.g., a flash memory), an erasable programmable ROM (EPROM), an electrically erasable programmable ROM (EEPROM), and any combinations thereof. A machine-readable storage medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a personal digital assistant "PDA", a mobile telephone, a smartphone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

Figure 7:
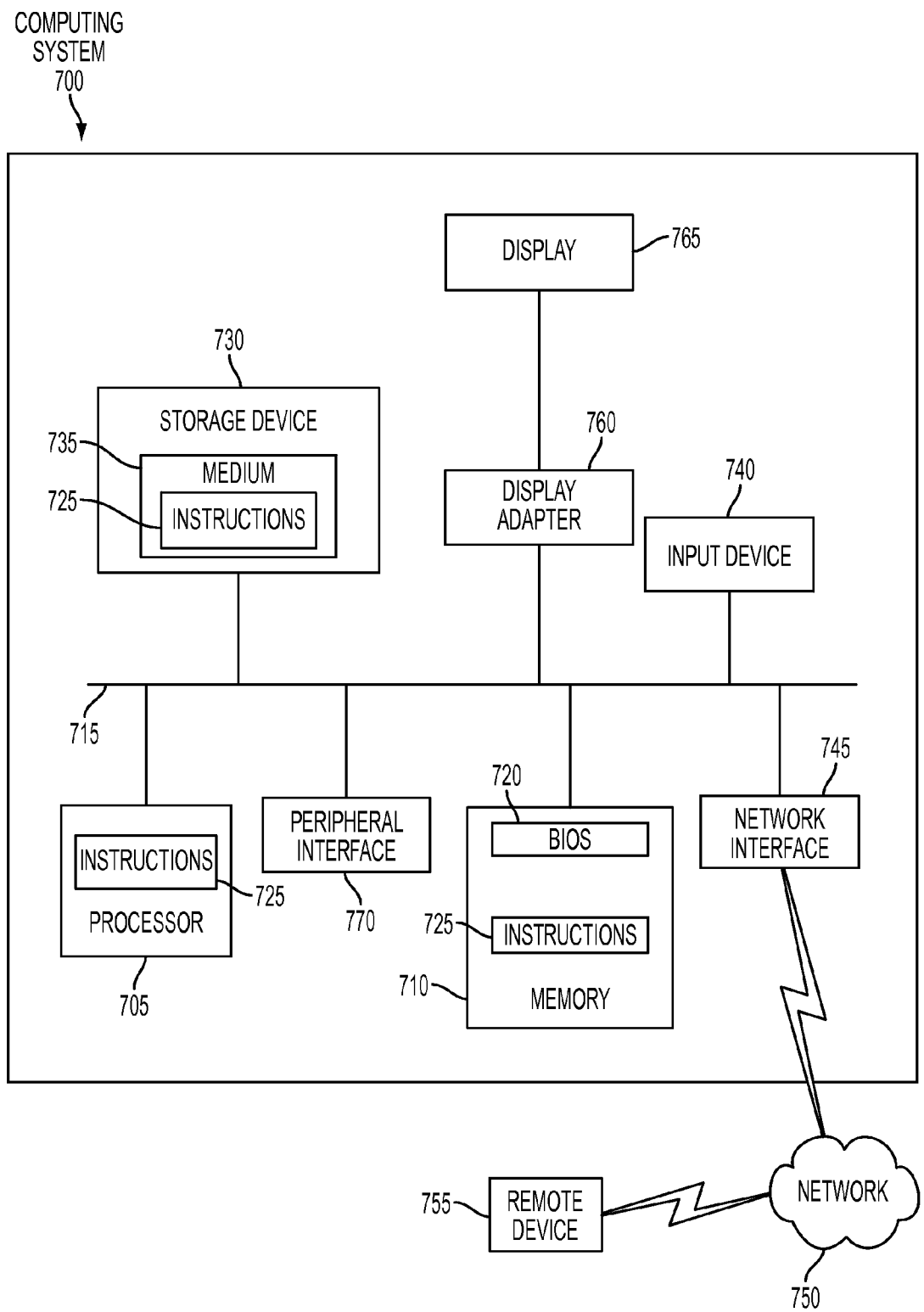
FIG. 7 is a high-level diagram of a computing system suitable for implementing an MIMAA system of the present disclosure.

FIG. 7 shows a diagrammatic representation of one embodiment of a computing device in the exemplary form of a computer system 700 within which a set of instructions for causing the device to perform any one or more of the aspects and/or methodologies of the present disclosure may be executed. It is also contemplated that multiple computing devices may be utilized to implement a specially configured set of instructions for causing the device to perform any one or more of the aspects, functionalities, and/or methodologies of the present disclosure. Computer system 700 includes a processor 705 and a memory 710 that communicate with each other, and with other components, via a bus 715. Bus 715 may include any of several types of bus structures including, but not limited to, a memory bus, a memory controller, a peripheral bus, a local bus, and any combinations thereof, using any of a variety of bus architectures.

Memory 710 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 720 (BIOS), including basic routines that help to transfer information between elements within computer system 700, such as during start-up, may be stored in memory 710. Memory 710 may also include (e.g., stored on one or more machine-readable media) instructions (e.g., software) 725 embodying any one or more of the aspects and/or methodologies of the present disclosure. In another example, memory 710 may further include any number of program modules including, but not limited to, an operating system, one or more application programs, other program modules, program data, and any combinations thereof.

Computer system 700 may also include a storage device 730. Examples of a storage device (e.g., storage device 730) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 730 may be connected to bus 715 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 730 (or one or more components thereof) may be removably interfaced with computer system 700 (e.g., via an external port connector (not shown)). Particularly, storage device 730 and an associated machine-readable medium 735 may provide nonvolatile and/or volatile storage of machine-readable instructions, data structures, program modules, and/or other data for computer system 700. In one example, software 725 may reside, completely or partially, within machine-readable medium 735. In another example, software 725 may reside, completely or partially, within processor 705.

Computer system 700 may also include an input device 740. In one example, a user of computer system 700 may enter commands and/or other information into computer system 700 via input device 740. Examples of an input device 740 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 740 may be interfaced to bus 715 via any of a variety of interfaces (not shown) including, but not limited to, a serial interface, a parallel interface, a game port, a USB interface, a FIREWIRE interface, a direct interface to bus 715, and any combinations thereof. Input device may include a touch screen interface that may be a part of or separate from display 765, discussed further below.

A user may also input commands and/or other information to computer system 700 via storage device 730 (e.g., a removable disk drive, a flash drive, etc.) and/or a network interface device 745. A network interface device, such as network interface device 745 may be utilized for connecting computer system 700 to one or more of a variety of networks, such as network 750, and one or more remote devices 755 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 750, may employ a wired and/or a wireless mode of communication. In general, any network topology may be used. Information (e.g., data, software 725, etc.) may be communicated to and/or from computer system 700 via network interface device 745.

Computer system 700 may further include a video display adapter 760 for communicating a displayable image to a display device, such as display device 765. Examples of a display device include, but are not limited to, a liquid crystal display (LCD), a cathode ray tube (CRT), a plasma display, a light emitting diode (LED) display, and any combinations thereof. In addition to a display device, a computer system 700 may include one or more other peripheral output devices including, but not limited to, an audio speaker, a printer, and any combinations thereof. Such peripheral output devices may be connected to bus 715 via a peripheral interface 770. Examples of a peripheral interface include, but are not limited to, a serial port, a USB connection, a FIREWIRE connection, a parallel connection, and any combinations thereof.

MIMAA systems of the present disclosure utilize mixed-initiative interaction to leverage a worker's knowledge of the context surrounding a message to automate the repetitive process of retrieving the effective information needed to act on the message. An MIMAA system of the present disclosure is not necessarily limited to messages, rather an MIMAA system can be adapted to any request in natural language form, semi-structured form, or structured form. The request can be delivered through any communication channel—speech, text message, instant messenger, etc. In particular, a request may not necessarily contain the information required to execute a particular agent. A worker may simply know the location of the data source and simply direct the MIMAA too to use a particular data source to run a particular agent. This method is used for the system described in connection with FIGS. 4 and 5.

MIMAA systems disclosed herein are based on the use of a worker's expertise at recognizing and declaring the information that is effective in particular situations along with the worker's capacity to demonstrate how that information is obtained to provide a tractable, usable, and appropriate basis for the communication of human intent to a machine agent. The present inventors have considered that workers' ability to adapt to information systems combined with their understanding of what makes information effective in particular contexts constitutes a system-specific intelligence that is currently underutilized.

An MIMAA system of the present disclosure comprises a mixed-initiative system of user-constructed agents, each of which is built and trained to retrieve information in response to a particular type of request. Aspects of the present invention allow workers to evolve the interaction by modifying the information they require over time and to refine the details through a process of repairing agent errors.

Aspects of the present invention rely on refining and evolving human and machine understanding of work processes, allowing both machine and humans to adapt to the actions of the other. MIMAA systems of the present disclosure can adapt processes to context over time, sensitize users to the need to incorporate process exceptions not originally foreseen, and allow for inclusion of new information sources, especially from the Internet, as they become available. This approach extends the work activities that people are already engaged in. The user declaration of effective information mimics workers' current workarounds for information systems, namely, the construction of their own information caches located, for example, in locally held spreadsheets, lists, and forms. Finally, we foresee that the end-user created agents that automate the retrieval of effective information constitute a valuable resource for more accurately capturing the work of the organization and the informational needs of workers, providing a rich resource during the redesign of information systems.

In building MIMAA systems of the present disclosure, the present inventors took a research-through-design approach that integrates advances in many domains to address problems in the real world. Specifically, such systems provide a novel integration of advances in mixed-initiative interaction, programming-by-demonstration, and machine learning to empower end-users to address their informational needs in specific instances in order to be more responsive. This approach leverages the rich experience that workers already possess with the power of machine learning to automate repetitive tasks. These systems allows users to create individual agents in an evolutionary way to address, over time, changes in their perception of what information would be effective in a specific situation. They also provide models wherein users communicate with machine-learning agents through a process of demonstration and repair. These systems build on workers' current practices of making shortcuts to increase their responsiveness, but without disconnecting these shortcuts from the latest data available in information systems. These systems also allow workers to decide which tasks and which aspects of tasks they wish to automate, giving them control over the scope of the automation.

Systems of the present invention will help workers be more responsive. They can reduce the labor needed to complete a task and increase the velocity of data within an organization, allowing the current snapshot within information systems to more accurately capture the current state of the world. By observing all programs that workers create and logging the number of instances each program has been triggered, the system can develop a much richer model of the kinds of work people perform, improving the design of future information systems intended to support these workers.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A machine-readable storage medium containing machine-executable instructions for implementing a mixed-initiative message augmenting agent system for augmenting like messages with information pertinent to the like messages, said machine-executable instructions comprising:
   a first set of machine-executable instructions that implement a build-and-demonstrate module that allows a user to create a form by retrieving information pertinent to a first one of the like messages;
   a second set of machine-executable instructions that implement an augmentation-repair module that allows the user to repair mixed-initiative message augmenting agent system; and
   a third set of machine-executable instructions that implement a learning algorithm that teaches a machine-learning agent to augment subsequent ones of the like messages as a function of at least one of 1) the retrieving of the information pertinent to the first one of the like messages and 2) the repair of the mixed-initiative message augmenting agent system.

2. A machine-readable storage medium according to claim 1, wherein said third set of machine-executable instructions includes machine-executable instructions that implement a learning algorithm that teaches the machine-learning agent to augment subsequent ones of the like messages as a function of both of 1) the retrieving of the information pertinent to the first one of the like messages and 2) the repair of the mixed-initiative message augmenting agent system.

3. A machine-readable storage medium according to claim 1 further comprising machine-executable instructions for automatedly retrieving data for populating the form.

4. A machine-readable storage medium according to claim 3, further comprising machine-executable instructions for automatedly populating the form in response to a request from the user for automatedly populating the form.

5. A machine-readable storage medium according to claim 3, further comprising machine-executable instructions that display an indication to the user that multiple data values are available for a cell of the form such that an ambiguity is present for the cell.

6. A machine-readable storage medium according to claim 5, further comprising machine-executable instructions for implementing a resolver that allows the user to resolve the ambiguity.

7. A machine-readable storage medium according to claim 1, further comprising machine-executable instructions that implement a wrapper-program component that wraps data within structured documents used to build the form.

8. A machine-readable storage medium according to claim 1, wherein said first set of machine-executable instructions includes machine-executable instructions that implement a nanosyntaxing scheme within the form.

9. A machine-readable storage medium according to claim 8, wherein said machine-executable instructions that implement the nanosyntaxing scheme includes machine-executable instructions for adding formatting tags to data acquired from a structured document using said first set of machine-executable instructions.

10. A machine-readable storage medium according to claim 1, wherein said first set of machine-executable instructions includes machine-executable instructions that allow the user to retrieve data from a structured document.

11. A machine-readable storage medium according to claim 10, wherein said machine-executable instructions that allow the user to retrieve data from the structured document includes machine-executable instructions that access the data from a markup language and hypertext transfer protocol levels.

12. A machine-readable storage medium according to claim 1, further comprising machine-executable instructions that provide the user interface that simultaneously displays to the user a structured document and a build-and-demonstrate workspace.

13. A machine-readable storage medium according to claim 1, wherein said first set of machine-executable instructions includes machine-executable instructions that allow the user to partially populate the form by user-selection of data and machine-executable instructions that further populate the form automatedly based on the user-selection of the data for partially populating the form.

14. A system, comprising:
a machine-readable storage medium containing machine-executable instructions for implementing a mixed-initiative message augmenting agent system for augmenting like messages with information pertinent to the like messages; and
a processor for executing said machine-executable instructions so as to implement:
a build-and-demonstrate module that allows a user to create a form by retrieving information pertinent to a first one of the like messages;
an augmentation-repair module that allows the user to repair mixed-initiative message augmenting agent system; and
a learning algorithm that teaches a machine-learning agent to augment subsequent ones of the like messages as a function of at least one of 1) the retrieving of the information pertinent to the first one of the like messages and 2) the repair of the mixed-initiative message augmenting agent system.

15. A system according to claim 14, wherein said learning algorithm teaches the machine-learning agent to augment subsequent ones of the like messages as a function of both of 1) the retrieving of the information pertinent to the first one of the like messages and 2) the repair of the mixed-initiative message augmenting agent system.

16. A system according to claim 14 wherein said build-and-demonstrate module automatedly retrieves data for populating the form in response to a request from the user for automatedly populating the form.

17. A system according to claim 16, wherein said build-and-demonstrate module displays an indication to the user that multiple data values are available for a cell of the form such that an ambiguity is present for the cell.

18. A system according to claim 17, wherein said build-and-demonstrate module includes a resolver that allows the user to resolve the ambiguity.

19. A system according to claim 14, wherein said build-and-demonstrate module implements a wrapper-program component that wraps data within structured documents used to build the form.

20. A system according to claim 14, wherein said build-and-demonstrate module implements a nanosyntaxing scheme within the form.

21. A system according to claim 20, wherein said build-and-demonstrate module adds formatting tags to data acquired from a structured document using said build-and-demonstrate module.

22. A system according to claim 14, wherein said build-and-demonstrate module allows the user to retrieve data from a structured document.

23. A system according to claim 22, wherein said build-and-demonstrate module is configured to access the data from a markup language and hypertext transfer protocol access point.

24. A system according to claim 14, wherein said build-and-demonstrate module provides a user interface that simultaneously displays to the user a structured document and a build-and-demonstrate workspace.

25. A system according to claim 14, wherein said build-and-demonstrate module allows the user to partially populate the form by user-selection of data and machine-executable instructions that further populate the form automatedly based on the user-selection of the data for partially populating the form.

26. A machine-readable storage medium containing machine-executable instructions for implementing a method of implementing a mixed-initiative machine-learning agent system, said machine-executable instructions comprising:
a first set of machine-executable instructions for storing a plurality of machine-learning agents;
a second set of machine-executable instructions for receiving a request for accessing a data source; and
a third set of machine-executable instructions for displaying to a user via a machine display all of the plurality of machine-learning agents associated with the data source in response to receiving the request.

27. A machine-readable storage medium according to claim 26, wherein said third set of machine-executable instructions includes machine-executable instructions for displaying all of the plurality of machine-learning agents associated with the data source in a machine-learning-agent build-and-demonstrate user interface.

28. A machine-readable storage medium according to claim 26, further comprising machine-executable instructions for allowing the user to select for use a desired one of all of the plurality of machine-learning agents associated with the data source.

29. A machine-readable storage medium according to claim 26, wherein said second set of machine-executable instructions includes machine-executable instructions for receiving a navigation request for navigating to a structured document.

30. A machine-readable storage medium according to claim 29, wherein said machine-executable instructions for receiving the navigation request for navigating to the structured document includes machine-executable instructions for receiving a uniform resource locator for the structured document.

\* \* \* \* \*